United States Patent [19]
Amano

[11] 3,939,577
[45] *Feb. 24, 1976

[54] PRACTICE BOARD FOR CONTRACT BRIDGE GAMES

[76] Inventor: Kozo Amano, No. 480, Sasaya, Fuyacho-Takeyamachi Sagaru, Nakagyo Kyoto, Kyoto, Japan

[*] Notice: The portion of the term of this patent subsequent to Mar. 19, 1991, has been disclaimed.

[22] Filed: Feb. 20, 1974

[21] Appl. No.: 444,046

Related U.S. Application Data

[63] Continuation-in-part of Ser. No. 278,458, Aug. 7, 1972, Pat. No. 3,797,128.

[52] U.S. Cl. .................................................. 35/8 B
[51] Int. Cl.² ........................................ G09B 19/22
[58] Field of Search ....................................... 35/8 B

[56] References Cited
UNITED STATES PATENTS

| | | | |
|---|---|---|---|
| 993,680 | 5/1911 | Herbert | 35/75 |
| 1,988,587 | 1/1935 | Ellsworth | 35/8 B |
| 2,204,199 | 6/1940 | Willis | 35/8 B |
| 2,300,737 | 11/1942 | Willis | 35/8 B |
| 2,395,088 | 2/1946 | Von Babo | 35/8 B |
| 3,797,128 | 3/1974 | Amano | 35/8 B |

*Primary Examiner*—Wm. H. Grieb
*Attorney, Agent, or Firm*—Staas & Halsey

[57] ABSTRACT

A practice board for contract bridge games is disclosed wherein one embodiment includes a rectangular sheet and another embodiment includes a circular sheet, each of which have indicia marked thereon and arranged in accordance with a predetermined contract bridge game, the indicia including four sets of first indicia showing the cards of each player's hand and being arranged such that one of the cards of each of the player's hands is eliminated each trick, second indicia showing cards to be played by each player on respective tricks, the first and second indicia being arranged in rows, trick by trick, representing 13 tricks, four sets of third indicia each of which shows bids by the corresponding player at respective rounds of bidding in a row, and two sets of fourth indicia each of which shows the number of tricks won by the corresponding partnership on the preceding tricks; cover member overlying the sheet and being provided with apertures formed therein corresponding to the indicia on the sheet and through which the indicia on each single trick can be seen, the apertures consisting of first, second, third and fourth sets of indicia on the sheet, the sheet being slidably mounted to slide or rotate relative to the cover at the end of each trick.

3 Claims, 7 Drawing Figures

PRACTICE BOARD FOR CONTRACT BRIDGE GAMES

CROSS REFERENCE TO RELATED APPLICATIONS:

This application is a continuation-in-part of U.S. application Ser. No. 278,458, filed Aug. 7, 1972 issued Mar. 19, 1974 as U.S. Pat. No. 3,797,128.

This invention relates to a practice board for contract bridge games, and more particularly, to a board for practicing on records of predetermined or celebrated contract bridge games by pursuing the games according to the progress thereof.

It is an object of the present invention to provide a practice board for contract bridge games whereby various different records of contract bridge games can be practiced by simply exchanging sheets having the game records marked thereon.

It is another object of the present invention to provide a practice board of the type above-described wherein a user can function either as the declarer or the defenders as any of the four players, North, East, South and West in practicing even on one sheet of a game.

It is a further object of the present invention to provide a practice board of the type described which is so constructed that a sheet having a game record marked thereon can be easily and securely shifted or rotated relative to a cover member.

It is a still further object of the present invention to provide a practice board of the type described which is made handy, simple in structure and manufactured at a low cost.

Essentially, according to the present invention, there is provided a practice board for contract bridge games which comprises a sheet having indicia marked thereon and arranged in accordance with a predetermined contract bridge game; a cover member overlying the sheet and having apertures formed therein corresponding to said indicia on the sheet and through which the indicia on each single trick can be seen, said sheet being arranged to be slidingly shifted or rotated relative to said cover member at the end of the tricks; and a base member slidably holding said sheet in cooperation with said cover member.

Various further and specific objects, features and advantages of the invention will be made apparent from the following description of particular embodiments of the invention taken in connection with accompanying drawings, in which.

Figure 1:
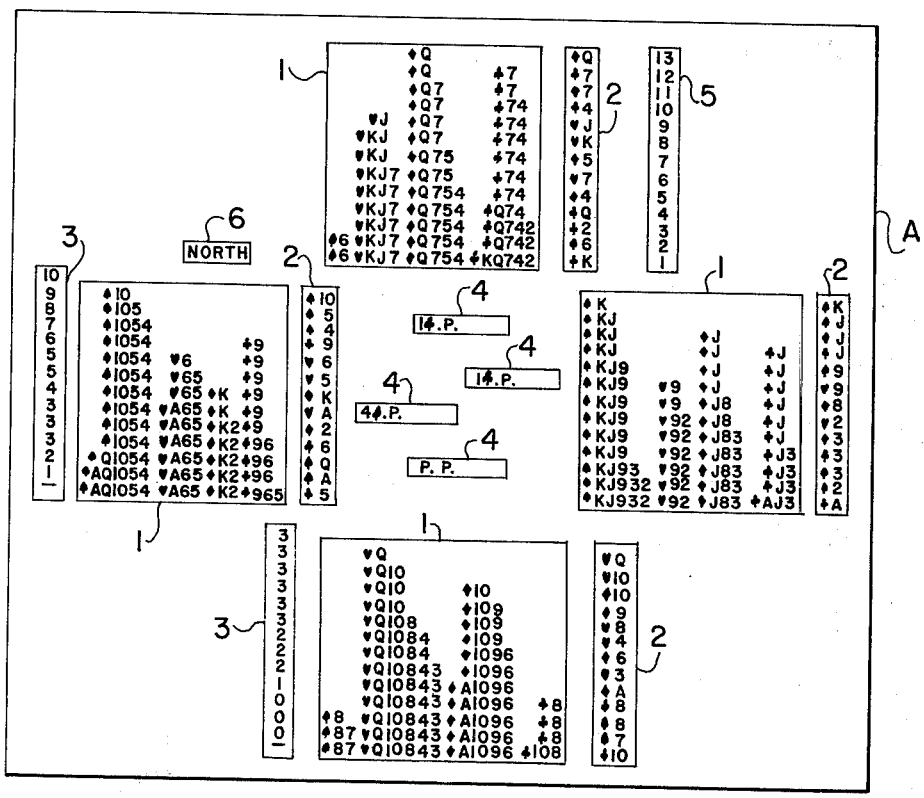
FIG. 1 is a plan view of a sheet having card indicia marked thereon in accordance with a predetermined or celebrated bridge hand to be employed in a practice board of one embodiment of this invention.
Figure 2:
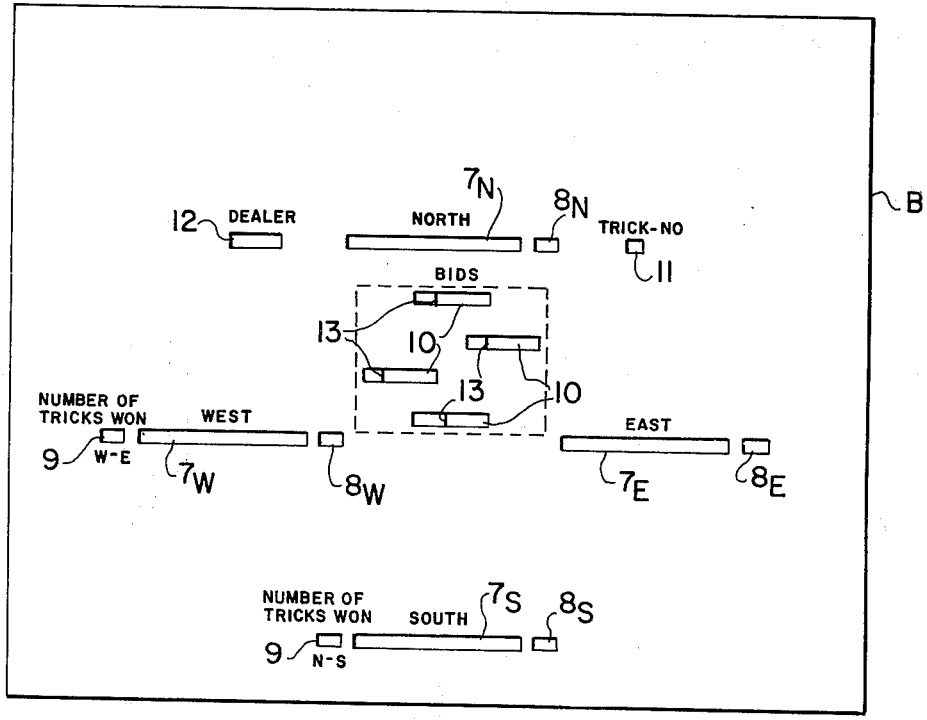
FIG. 2 is a plan view of a cover member for the embodiment shown in FIG. 1.
Figure 3:
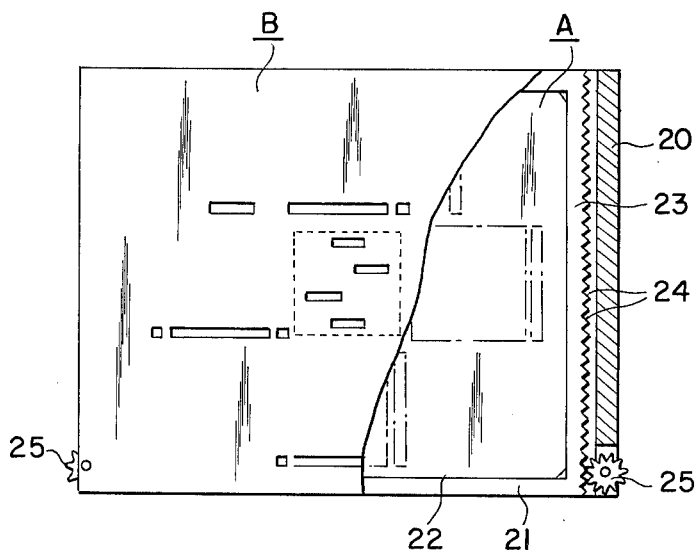
FIG. 3 is a plan view of a practice board in an assembled state, certain parts of which are broken away to show the construction more clearly.

Referring to FIGS. 1 – 3, character A represents a sheet having indicia arranged thereon in accordance with a contract bridge game. The sheet A has four sets of first indicia 1 each showing the cards held by the corresponding player of North, East, South and West and second indicia 2 each showing the cards to be played by the corresponding player on respective tricks, two sets of fourth indicia 3 each showing the number of tricks won by the corresponding partnership on the preceding tricks and four sets of third indicia 4 each showing bids of the corresponding player at respective rounds of bidding. Fifth indicia 5 showing the order of the tricks and sixth indicia 6 showing the dealer are further provided.

Character B represents a cover member formed of cardboard, metal or similar material and having a number of sets of apertures through which the indicia on the sheet A on each one of the thirteen tricks can be seen when the cover member B is placed over the sheet A as shown in FIG. 3. The predetermined or celebrated game can be practiced by sliding the sheet A beneath the cover member B downward or toward the user trick by trick in order.

The cover member B has four sets of a first aperture 7 through which the indicia 1 showing the hand can be read, and a second aperture 8 through which the second indicia 2 showing the playing card can be read, two sets of a fourth aperture 9 through which the fourth indicia 3 showing the number of tricks won can be read and four sets of a third aperture 10 through which the third indicia 4 showing the bids can be read. An aperture 11 through which the indicia 5 showing the order of the tricks can be read and aperture 12 through which the dealer of the indicia 6 can be read are further provided. Numeral 1 in the indicia 5 means the trick No. 1.

In proceeding with the game, the sheet A is first set so that the numeral 1 appears through the aperture 11 of the cover member B. At this moment, through the apertures 7N, 7E, 7S and 7W there are indicated the cards in hand of the respective players which are arranged suit by suit. Through the apertures 10N, 10E, 10S and 10W can be seen the bids at respective rounds of bidding. Slidable or other movable lids 13 are mounted on the cover member B to cover the apertures 10N, 10E, 10S and 10W in a manner that the apertures can be opened in order to show the bids at the first, second and succeeding rounds. Similar lids (not shown) are mounted on the apertures 7N, 7E, 7S and 7W and the apertures 8N, 8E, 8S and 8W whereby the cards can be read only when the apertures are open.

If the user is South, the aperture 7S is arranged to open leaving the remaining three sets of the cards covered with said lids. The thirteen cards now shown in the aperture 7S are the hand of South. Since the dealer is North in this game as shown by the indicia 6, the aperture 10N is first opened by a space corresponding to one round to show that North's first bid is one club. Then, the aperture 10E is opened to learn that East overcalls with one spade. It is now the user's turn of bidding. While the aperture 10S is kept closed, the user can sufficiently study to bid on the exposed hand shown through the aperture 7S. Then, he may compare his bid with the correct bid of the indicia 4S by moving the lid 13S to open the aperture 10S by one round of bidding.

If his bid is different from that indicated by the indicia 4S, he may examine the reason why he has made the different bid.

Then the aperture 10W is opened to learn West's bid. At the second round of bidding, the apertures 10N and 10E are further opened in order to show North's and South's second bids. The user's own bid is studied on his exposed hand and then, the aperture 10S is further opened to show his bid at the second round. In this game record, the opener is North and the contract is 4 spades of West whereby the declarer is East who bids the suit before West does.

The apertures 10N–10W are all closed and now the play begins.

Since the declarer is East, the opening lead is made by South, selecting one card from the thirteen cards shown through the aperture 7S. The opening lead is predetermined as the ten of clubs. However, while the aperture 8S is kept closed, the user may fully think over his hand as to which card he should lead. After the card to lead is decided, the aperture 8S is opened to know the correct opening lead. Confirmation or examination of his play follows in a similar manner to bidding.

Since West is the dummy, West's hand is exposed by opening the aperture 7W which is kept open all through the deal. Then the aperture 8W is opened to see which card of the dummy is played by the declarer. The apertures 8N and 8E are successively opened and all the four cards from respective players are shown. In this game, East wins the trick with the ace of clubs.

Then, the sheet is slidingly pulled downward or toward the user, after the apertures 8N–8W are all closed, to show No. 2 of the indicia 5 through the aperture 11. The twelve cards left in the respective hands are shown through the apertures 7N–7W though covered with the lids except 7W. It is shown through the aperture 9W that the declarer's side won the previous trick and has already gained one trick. The aperture 8E is opened to see the card which East leads. A card is selected from the twelve cards in South's hand shown through the aperture 7S, and confirmation or examination follows by opening the aperture 8S. Thereafter, the apertures 8W and 8N are open to see the winner of the second trick.

The apertures 8N–8W are all closed and the sheet is further pulled to show No. 3 through the aperture 11. Thus, in the same manner, the play is repeated until the thirteenth trick is over. In the game record indicated on the sheet of FIG. 1, the declarer wins ten tricks and his contract of four spades has been just made.

Though the user is supposed to be South in the above description, he may be any of the four players in practicing on the present practice board. In any case, the user can see only his hand and the dummy. The apertures of the other two players are kept closed except the apertures 8.

Figure 4:
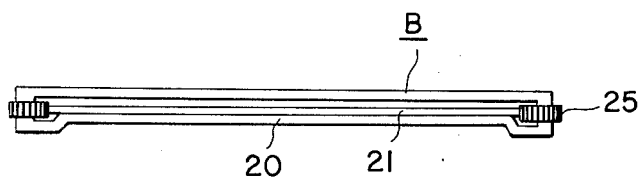
FIG. 4 shows a side elevation of FIG. 3.
Figure 5:
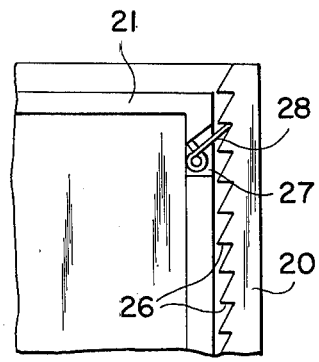
FIG. 5 is an enlarged plan view of another embodiment of the invention showing a part of a rack and a spring construction slidably supporting the sheet.

Referring to FIGS. 3–5, numeral 20 represents a base member formed integrally with the cover member B or rigidly fixed thereto. A support member 21 having a step 22 which forms a recess inside for firmly holding the sheet A is slidably provided in a room between the cover member B and the base member 20. For detaching the sheet A from the support member 21, in the recess of the member 21 may be formed a hole through which a finger can push out the sheet A from the back. The support member 21 may be of such construction that both ends thereof are folded inward to hold the sheet A in the folded portions. In this case, the sheet A may be slightly larger in width than the support member 21 thereby to enable the sheet A to be securely held by a flexural rigidity thereof against the side portions 23 of the support member 21.

Each side portion 23 is formed with a rack 24 along the outer end thereof in engagement with a pinion 25 which is rotatably provided on each side portion of the base member 20 at an adequate position, preferably in the lower portion. Said pinion 25 is so attached to the base member 20 as shown in FIG. 3 that a portion thereof slightly projects from the outer end of the base member 20 and can be rotated by a finger. The support member 21 can slidingly move relative to the base member 20 with rotation of the pinion 25, permitting the shift of the sheet A relative to the cover member B in accordance with the progress of the tricks. With such a construction having the racks and pinions, the sheet A can be reliably shifted and a precise adjustment is made possible.

In the base member 20 may be formed apertures corresponding to those apertures in the cover member B to provide particular explanations and instructions of the play or reference to pages of a manual thereby to enhance effects of the practice.

Referring to FIG. 5, there is shown a modification of the above structure in which a saw-toothed rack 26 is formed along an inner end of each side portion of the base member 20 in resilient engagement with a leaf spring 28 which is attached to the support member 21 in a cut-out portion 27 formed in each side portion thereof. With such a construction as above described, the sheet A can be securely shifted at every stage of the game.

Figure 6:
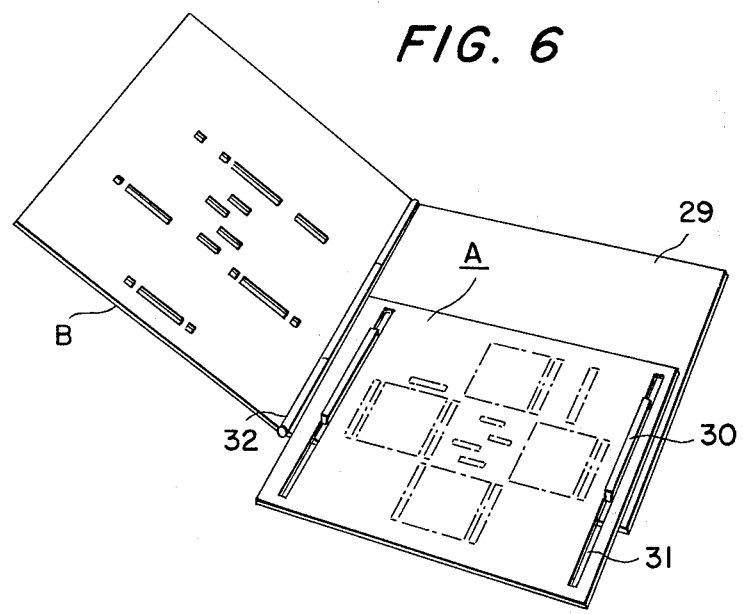
FIG. 6 is a further embodiment of the invention showing another construction for supporting the sheet.

Referring to FIG. 6, there is shown a further embodiment having a different construction of the practice board. The base member 29 is provided with at least one guide rail 30 which is projectingly formed inside in either or each side portion preferably in a lower half portion of the base member 29. The sheet A has slits 31 corresponding to said guide rails 30 which are slidably fitted in said slits thereby allowing the sheet A to easily slide. In this embodiment, the cover member B is simply hinged by a hinge 32 to the base member 29 and, therefore, the present embodiment can be manufactured at a low cost.

Figure 7:
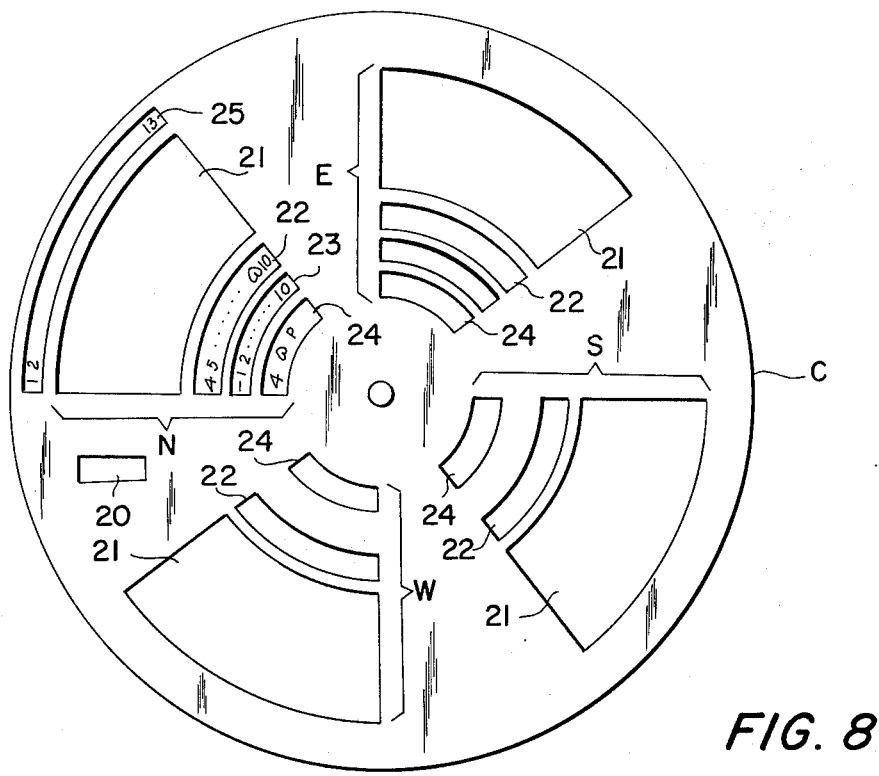
FIG. 7 is a plan view of a sheet having card indicia marked thereon in accordance with a predetermined or celebrated bridge hand to be employed in a circular embodiment of this invention.
Figure 8:
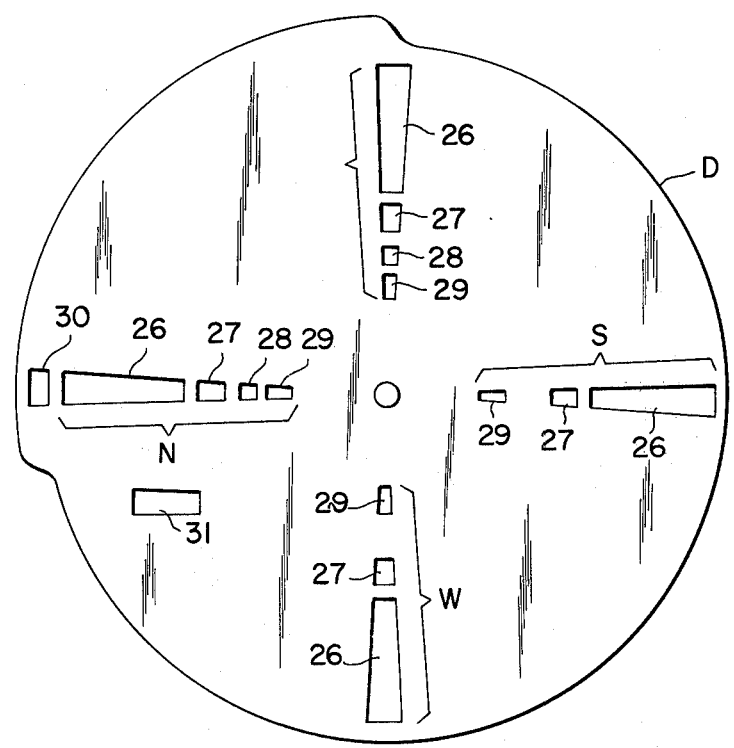
FIG. 8 is a plan view of a cover member for the circular embodiment shown in FIG. 7.

Referring to FIGS. 7 and 8, character C represents a sheet having indicia arranged thereon in accordance with a contract bridge game. The sheet C has four sets of first indicia 21 each showing the cards held by the corresponding player of North, East, South and West and second indicia 22 each showing the cards to be played by the corresponding player on respective tricks, two sets of fourth indicia 23 each showing the number of tricks won by the corresponding partnership on the preceding tricks and four sets of third indicia 24 each showing bids of the corresponding player at respective rounds of bidding. Fifth indicia 25 showing the order of the tricks and sixth indicia 20 showing the dealer are further provided.

Character D represents a cover member formed of cardboard, metal or similar material and having a number of sets of apertures through which the indicia on the sheet C on each one of the thirteen tricks can be seen when the cover member D is placed over the sheet C. The predetermined or celebrated game can be practiced by slidingly rotating the sheet C beneath the cover member D trick by trick in order.

The cover member D has four sets of a first aperture 26 through which the indicia 21 showing the hand can be read, four sets of a second aperture 27 through which the second indicia 22 showing the playing card can be read, two sets of a fourth aperture 28 through which the fourth indicia 23 showing the number of tricks won can be read and four sets of a third aperture 29 through which the third indicia 24 showing the bids can be read. An aperture 30 through which the indicia 25 showing the order of the tricks can be read and aperture 31 through which the indicia of the dealer 20 can be read are further provided. Numeral 1 in the indicia 25 means the trick No. 1.

This embodiment of the game proceeds in a manner similar to that of the previous embodiment. The sheet C is first set so that the numeral 1 appears through the aperture 30 of the cover member C. At this moment, through the apertures 26 there are indicated the cards in hand of the respective players which are arranged suit by suit. Through the apertures 29 can be seen the bids at respective rounds of bidding. Slidable or other movable lids (not shown) are mounted on the cover member D to cover the apertures 29 in a manner that the apertures can be opened in order to show the bids at the first, second and succeeding rounds. Similar lids (not shown) are mounted on the apertures 26 and the apertures 27 whereby the cards can be read only when the apertures are open.

The game opens by bidding as in the previous embodiment. In the particular game illustrated in FIGS. 7 and 8 the opener is North, the contract is West's 4 spades and the declarer is East.

The opening lead is made by South, selecting one card from the thirteen cards shown through the aperture 26S. The opening lead is predetermined as the ten of clubs. However, while the aperture 27S is kept closed, the user may fully think over his hand as to which card he should lead. After the card to lead is decided, the aperture 27S is opened to know the correct opening lead. Confirmation or examination of his play follows in a similar manner to bidding.

Since West is the dummy, West's hand is exposed by opening the aperture 26W which is kept open all through the deal. Then the aperture 27W is opened to see which card of the dummy is played by the declarer. The apertures 27N and 27E are successively opened and all the four cards from respective players are shown. In this game, East wins the trick with the ace of clubs.

Then, the sheet C is slidingly rotated counterclockwise beneath cover member D, after the apertures 27 are all closed, to show No. 2 of the indicia 25 through the aperture 30. The twelve cards left in the respective hands are shown through the apertures 26 though covered with the lids except 26W. It is shown through the aperture 28E that the declarer's side won the previous trick and has already gained one trick. The aperture 27E is opened to see the card which East leads. A card is selected from the twelve cards in South's hand shown through the aperture 26S, and confirmation or examination follows by opening the aperture 27S. Thereafter, the apertures 27W and 27N are opened to see the winner of the second trick.

The apertures 27 are all closed and the sheet is further rotated to show No. 3 through the aperture 30. Thus, in the same manner, the play is repeated until the thirteenth trick is over. In the game record indicated on the sheet of FIG. 7, the declarer wins ten tricks and his contract of four spades has been just made.

While a few embodiments of the invention have been illustrated and described in detail, it is to be clearly understood that the invention shall not be limited thereto and may have other embodiments within the spirit of the invention.

I claim:

1. A practice board for contract bridge, comprising a circular sheet having indicia marked thereon and arranged in accordance with a predetermined contract bridge game, said indicia including four sets of first indicia showing the cards of each player's hand and being arranged such that one of said cards for each of said player's hand is eliminated each trick, second indicia showing cards to be played by each player on respective tricks, said first and second indicia being arranged in rows, trick by trick, representing thirteen tricks, four sets of third indicia, each of said four sets of third indicia showing bids of the corresponding player at respective rounds of bidding in a row; a circular cover member overlying said sheet and being provided with apertures formed therein corresponding to said sets of indicia on said sheet and through which said indicia on each single trick can be seen, said apertures comprising first, second and third apertures corresponding to said first, second and third sets of indicia of said sheet, said first and second apertures being of a width sufficient to show the indicia of a single trick, said third aperture being arranged to said third indicia when the remaining apertures show the indicia on the first trick; and means permitting said sheet to be rotated relative to said cover at the end of each trick.

2. A practice board as in claim 1, including manually operable lids positioned on said cover member at said first and second apertures.

3. A practice board as in claim 1, wherein said circular sheet having indicia marked thereon, further includes two sets of fourth indicia each of which shows the number of tricks won by the corresponding partnership on the preceding tricks; and said circular cover member comprising fourth apertures corresponding to said fourth sets of indicia.

* * * * *